(12) United States Patent
Feng et al.

(10) Patent No.: US 7,336,400 B2
(45) Date of Patent: Feb. 26, 2008

(54) TRANSFORMING AN INPUT IMAGE TO PRODUCE AN OUTPUT IMAGE

(75) Inventors: Guotong Feng, West Lafayette, IN (US); Michael George Fuchs, Boise, ID (US); Charles A. Bouman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 10/284,803

(22) Filed: Oct. 31, 2002

(65) Prior Publication Data

US 2004/0085592 A1    May 6, 2004

(51) Int. Cl.
*H04N 1/40* (2006.01)
(52) U.S. Cl. .................... 358/3.27; 358/3.15
(58) Field of Classification Search ............. 358/3.27, 358/3.15, 1.9, 2.1, 1.15; 382/266, 276, 283, 382/199
See application file for complete search history.

(56) References Cited

U.S. PATENT DOCUMENTS

| | | | |
|---|---|---|---|
| 5,272,764 A | 12/1993 | Bloomberg et al. | |
| 5,696,842 A | 12/1997 | Shirasawa et al. | |
| 5,706,361 A * | 1/1998 | Kent et al. ................ | 382/103 |
| 5,784,498 A * | 7/1998 | Venable ................ | 382/254 |
| 5,812,702 A | 9/1998 | Kundu | |
| 5,969,372 A * | 10/1999 | Stavely et al. ......... | 250/559.42 |
| 6,298,151 B1 | 10/2001 | Jodoin et al. | |
| 6,373,981 B1 | 4/2002 | de Queiroz et al. | |
| 6,400,844 B1 | 6/2002 | Fan et al. | |
| 6,628,833 B1 * | 9/2003 | Horie ................ | 382/173 |
| 2002/0070932 A1 * | 6/2002 | Kim ................ | 345/419 |

FOREIGN PATENT DOCUMENTS

| EP | 0415722 A2 | 3/1991 |
|---|---|---|
| EP | 1223552 A2 | 7/2002 |

OTHER PUBLICATIONS

P. Li and J. P. Allebach, *Tone Dependent Error Diffusion*, Color Imaging: Device Independent Color, Color Hardcopy, and Applications VII, R. Eschbach and G. G. Marcu, eds, SPIE vol. 4663, San Jose, CA Jan. 22-25, 2002, pp. 310-321.

* cited by examiner

*Primary Examiner*—David Moore
*Assistant Examiner*—Stephen Brinich (57) ABSTRACT

An input image is transformed to produce an output image. Pixels occurring at edges that represent detail within the input image are detected to produce an intermediate image. Background fill representing textures of the input image is generated. The background fill and the intermediate image are combined to produce the output image.

41 Claims, 7 Drawing Sheets

| 64 | 60 | 52 | 25 | 26 | 41 | 53 | 61 |
|----|----|----|----|----|----|----|----|
| 59 | 51 | 40 | 13 | 14 | 27 | 42 | 54 |
| 50 | 39 | 24 | 5  | 6  | 15 | 28 | 43 |
| 38 | 23 | 12 | 1  | 2  | 7  | 16 | 29 |
| 37 | 22 | 11 | 4  | 3  | 8  | 17 | 30 |
| 49 | 36 | 21 | 10 | 9  | 18 | 31 | 44 |
| 58 | 48 | 35 | 20 | 19 | 32 | 45 | 55 |
| 63 | 57 | 47 | 34 | 33 | 46 | 56 | 62 |

TRANSFORMING AN INPUT IMAGE TO PRODUCE AN OUTPUT IMAGE

BACKGROUND

A digital sender is a system designed to obtain documents (for example by scanning), convert the documents to a chosen format and route the formatted document to a desired destination or destinations using an available communication protocol. Digital senders generally support a variety of document types, a variety of data formats, and a variety of communication protocols.

Examples of typical document formats include tagged image file format (TIFF), multipage TIFF (MTIFF), portable document format (PDF), and joint picture experts group (JPEG). Examples of typical communication methods include computer networks and facsimile transmission (fax).

Documents can be classified based on content. For example, text documents typically contain black text on a white background. Formats used to transmit text documents typically are optimized to provide for crisp edges to effectively define characters. Traditional fax is designed to efficiently transmit text (black text on a white background) documents.

Graphics documents typically contain color or grayscale images. Formats used to transmit continuous tone images, for example, continuous tone color photographs, can be very effectively represented using the JPEG format.

Mixed content documents typically include a combination of text and graphic data. These documents often require more specialized solutions because existing formats used for transmission and storage of image data are optimized for use with either black and white text, or with continuous tone images.

The current TIFF specification supports three main types of image data: black and white data, halftones or dithered data, and grayscale data.

Baseline TIFF format can be used to store mixed content documents in black and white (i.e. binary) formats. Baseline TIFF format supports three binary compression options: Packbits, CCITT G3, and CCITT G4. Of these, CCITT G3, and CCITT G4 compression are compatible with fax machines.

Halftoning algorithms, such as error diffusion, can be used to create a binary representation of (i.e. binarize) a continuous tone image. Such an image can be subsequently compressed using CCITT G3, and CCITT G4 compression so they are suitable for fax transmission. However, CCITT G3 compression, and CCITT G4 compression generally do not provide for the desired compression ratios for halftone images. Therefore CCITT G3, and CCITT G4 compression of halftone mixed content documents results in large file sizes and subsequently very long fax transmission times.

A binary representation of an input document can be created by performing a binary threshold operation using a constant threshold for the entire image. However, when CCITT G3/G4 compression is performed on such a document, there is generally unsatisfactory representation of continuous tone document content and color text on color background. Likewise, when halftoning an input document using error diffusion such as Floyd Steinberg, with CCITT G3/G4 compression, this can result in inadequate compressibility of halftone using G3 and G4 (i.e. fax) compression.

SUMMARY OF THE INVENTION

In accordance with the preferred embodiment of the present invention, an input image is transformed to produce an output image. Pixels occurring at edges that represent detail within the input image are detected to produce an intermediate image. Background fill representing textures of the input image is generated. The background fill and the intermediate image are combined to produce the output image.

DESCRIPTION OF THE PREFERRED EMBODIMENT

Figure 1:
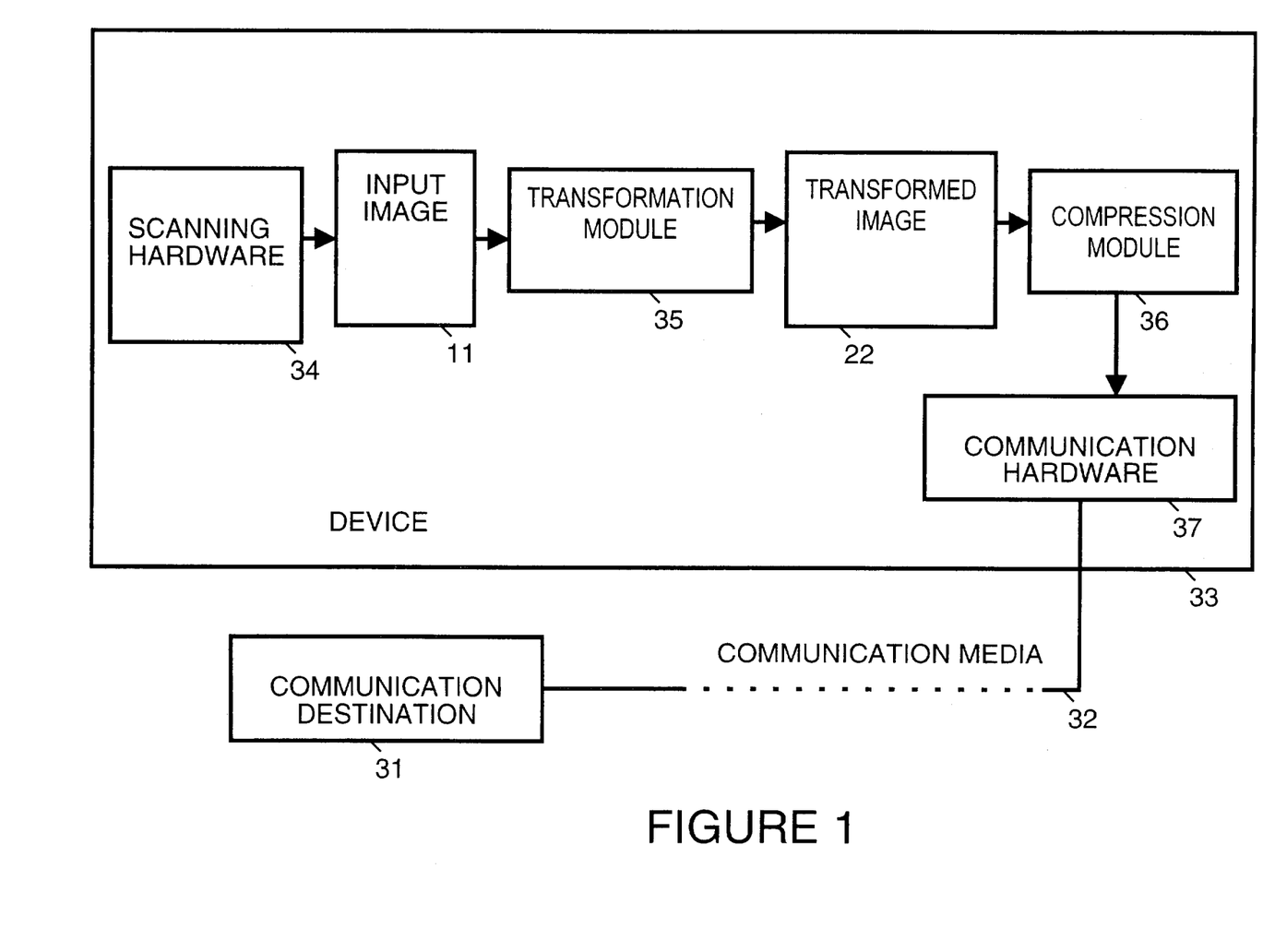
FIG. 1 is a block diagram of a device.

FIG. 1 is a simplified block diagram of a device 33. Device 33 is, for example, a digital sender such as a scanner, a fax machine or some other device that sends information in digital form. Alternatively, device 33 can be any device that handles image information, such as a printer or a copier.

Device 33 includes, for example, scanning hardware 34 that performs a scan to produce an input image 11. Input image 11 could, for example, be obtained in other ways such as by an access from an information storage device. Also, input image 11 is, for example, a grayscale image. Alternatively, input image 11 is a color image or another type of image that can be generated by scanning hardware 34 or accessed by some other means.

A transformation module 35 transforms input image 11 to produce a transformed image 22. For example, transformed image 22 is a binary image and transformation module 35 binarizes input image 11 to produce transformed image 22. Alternatively, transformed image 22 is a multi-level image and transformation module 35 uses a multilevel process to transform input image 11 in order to produce transformed image 22.

Transformation module 35 can be implemented in a number of different ways, for example by a processor and firmware, by software or within an application specific integrated circuit (ASIC).

A compression module 36 is used to perform compression on transformed image 22 in preparation for sending, through communication hardware 37, to a communication destination 31 via communication media 32. Communication media 32 can be, for example, a metal wire, optical media or a wireless communication media.

Figure 2:
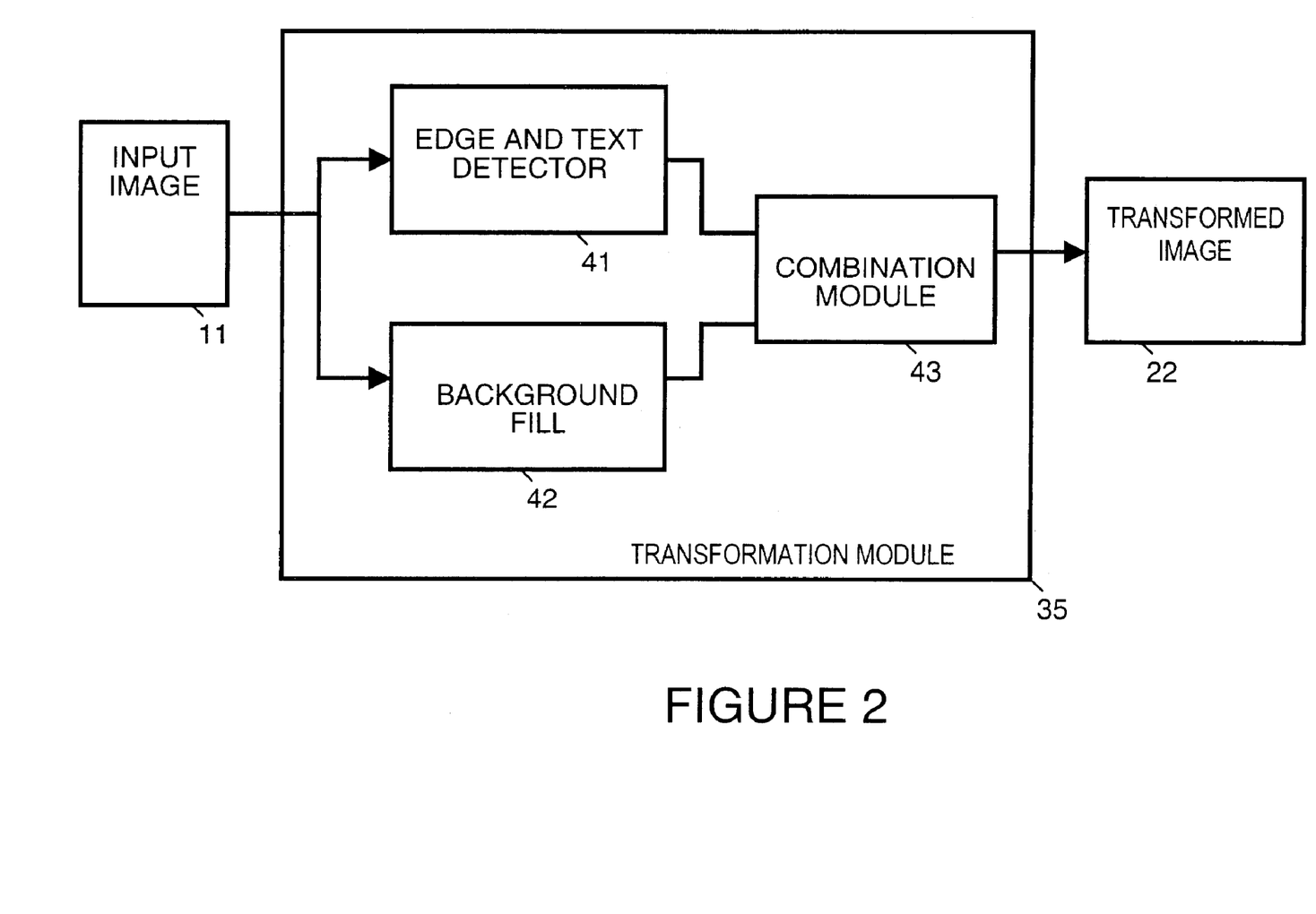
FIG. 2 is a block diagram of a transformation module of the digital sender shown in FIG. 1, in accordance with an embodiment of the present invention.

FIG. 2 is a block diagram of transformation module 35. Transformation module 35 includes an edge and text detector 41 that detects text within input image and detects edges within graphic regions within input image 11. The resulting image produced by edge and text detector 41 has improved compressibility and shows text and shows edges within and around graphics.

Transformation module 35 also includes a background fill module 42. Background fill module 42 represents the textures within input image 11, yet does so in a form that has improved compressibility. This is done, for example using a clustered dot scheme for halftoning input image 11.

A combination module 43 combines the output of edge and text detector 41 with the output of background fill module 42. The result is a transformed image 22 that has improved compressibility and substantially preserves text, graphics edges and texture from input image 11. For example, combination module 43 may perform a logical OR function on each pixel of the output of edge and text detector 41 and background fill module 42.

Edge and text detector 41 produces output in a format that provides a representation of binary mixed document content with improved compressibility. In essence, edge and text detector 41 operates by extracting text edges and graphic outline from the background of input image 11 using locally adaptive binary thresholding techniques.

Input image 11 can be represented in raster format as set out in Equation 1 below:

$$0 \leq g[m,n] \leq 1 \qquad \text{Equation 1}$$

g[m,n] represents the shading at a two dimensional pixel location [m,n] within input image 11 with, for example, "0" being equal to white and "1" being equal to black.

Figure 3:
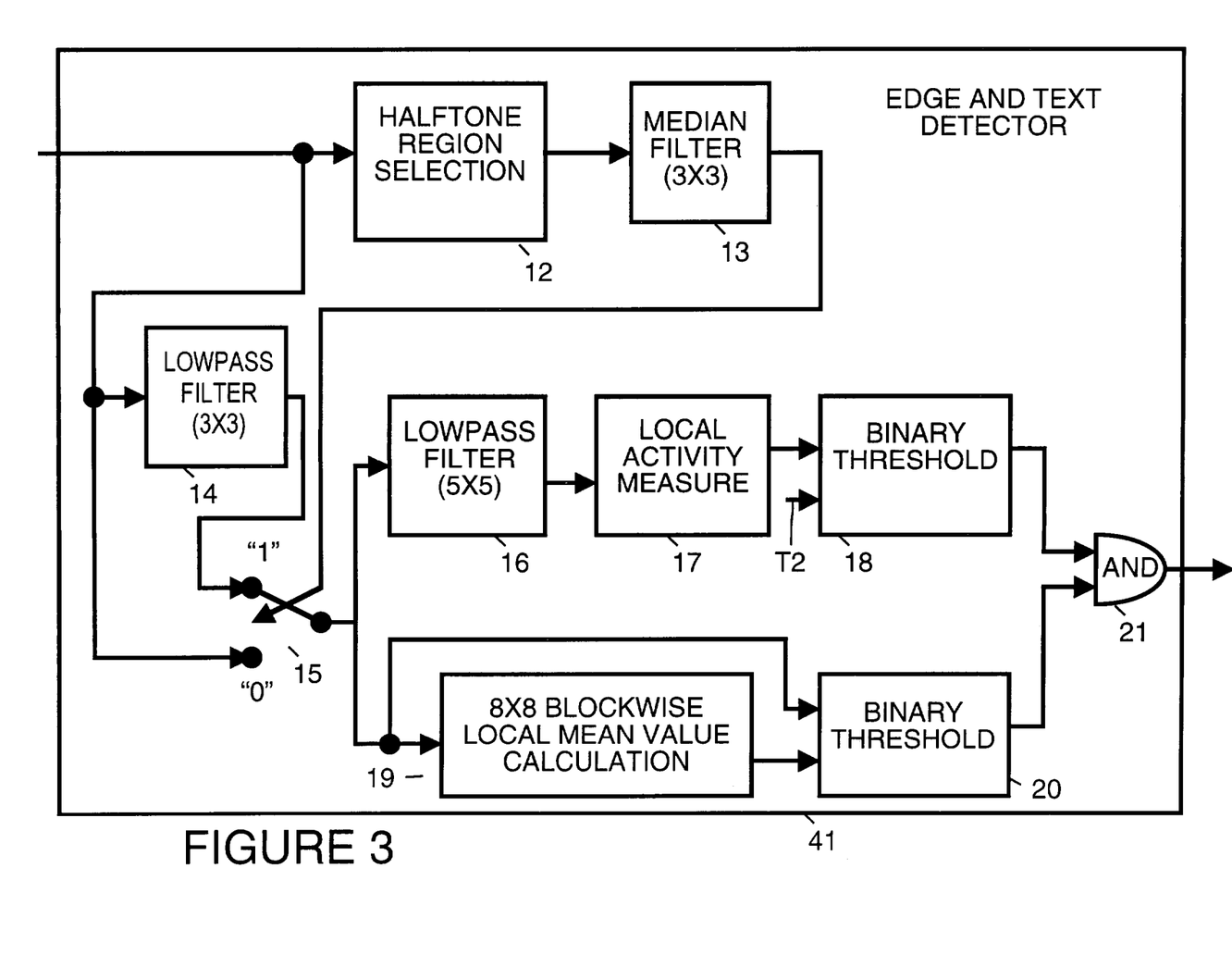
FIG. 3 is a block diagram of an edge and text detector module within the transformation module shown in FIG. 2, in accordance with an embodiment of the present invention.

FIG. 3 is a block diagram of edge and text detector 41. In the disclosed embodiment, edge and text detector 41 performs binary thresholding. In alternative embodiments, edge and text detector 41 can perform multi-level transformations. In a halftone region selection block 12, input image 11 is evaluated to select halftone regions within input image 11. In a halftone region selection block 12, for each pixel [m,n], d[m,n] is calculated where d[m,n] is equal to "0" if the pixel is in a non-halftone region and is equal to "1" if the pixel is in a halftone region. d[m,n] is calculated in accordance with Equation 2 set out below:

$$d[m,n]=u(T1-|g[m,n]-0.5|) \qquad \text{Equation 2}$$

In Equation 2 above, T1 is a preselected threshold value and the function u(x) is equal to 1 if (x≧0) and is equal to 0 if (x<0). In essence then, if shading at pixel (m,n) is close to white ("0") or black ("1") d[m,n] is equal to 0 (non-halftone), otherwise, d[m,n] is equal to 1 (halftone).

Median filter block 13 represents a median filter operation where median filtering is performed on the transformed image output from halftone region selection block 12 by using three by three (3×3) matrices of pixels in order to reduce noise and to make a determination as whether the pixel centered in each 3×3 matrix is to be regarded as in a halftone region (1) or in a non-halftone region (0).

The "0" or "1" value for each pixel generated by median filter block 13 is used to control a switch 15. Switch 15 makes a selection based on whether the pixel is regarded as in a halftone region or in a non-halftone region. If the pixel of input image 11 is regarded as in a non-halftone region, then switch 15 selects to take the pixel to be processed without filtering. If the pixel of input image 11 was determined by median filter block 13 to be in a halftone region, then switch 15 selects to receive the pixel of input image 11 after being processed by a lowpass filter 14. Lowpass filter 14 performs a 3×3 lowpass filtering operation on each pixel of input image 11 that is determined in median filter block 13 to be halftone in order to reduce background noise and undesired halftone textures. The switching performed by switch 15, controlled by median filter block 13, is beneficial because it allows fine edge detail to be substantially preserved while still reducing undesirable halftone textures from input image 11.

After switch 15, the resulting image is processed through two independent binary thresholding processes. In a first binary thresholding process, the resulting image at switch 15 is processed by a 5×5 lowpass filter 16. Lowpass filter 16 filters the image using five by five (5×5) matrices of pixels from the image.

A local activity measure block 17 computes a local activity measure (e[m,n]) for every pixel [m,n]. The local activity measure (e[m,n]) for each pixel [m,n] is computed as the square root of the average of the difference squared between the center pixel, x[m,n], and its eight neighbors, in accordance with Equation 3 below:

$$e[m,n]=\text{sqrt}((\tfrac{1}{8})*\text{sum}(|x[m,n]-x[i,j]|^2)), \qquad \text{Equation 3}$$

where [i,j] is one of the eight neighboring pixels of [m,n]

A binary threshold block 18 compares the local difference value e[m,n] for each pixel to an constant threshold T2, creating the transformed image output of the first binary thresholding process. The binary value b1[m,n] assigned to each pixel [m,n] can be calculated in accordance with Equation 4 set out below:

$$b1[m,n]=u(e[m,n]-T2) \qquad \text{Equation 4}$$

In Equation 4 above, T2 is a preselected threshold value and the function u(x) is equal to 1 if (x≧0) and is equal to 0 if (x<0). In essence then, for e[m,n]≧T2, b1[m,n]=1. Otherwise, b1[m,n]=0. For example, constant threshold T2 has a value of 0.02.

The first binary thresholding process detects edges that represent detail within the input image. The edges include edges of graphics and text. The pixels that form the edge regions are separated from uniform fill and background. However, the first binary thresholding process tends to blur sharp edges, so it tends to distort the shape of fine text structures. This generally causes the strokes of letters to look wider than the original letters.

In a second binary thresholding process performed after switch 15, 8×8 blockwise local mean value calculation block 19 calculates a local mean value (T[m/8,n/8]) for blocks of pixels arranged in eight by eight (8×8) matrixes of pixels. The local mean value (T[m/8,n/8]) of each block is used by a binary threshold block 20 to perform a binary threshold calculation of all the pixels in that block. The binary value b2[m,n] assigned to each pixel [m,n] can be calculated in accordance with Equation 5 set out below:

$$b2[m,n]=u(f[m,n]-T[m/8,n/8]) \qquad \text{Equation 5}$$

In Equation 5 above, T[m/8,n/8] is a calculated threshold value and the function u(x) is equal to 1 if (x≧0) and is equal to 0 if (x<0). f[m,n] is the shading value for each pixel [m,n] after switch 15. In essence then, for f[m,n]≧T[m/8,n/8], b2[m,n]=1. Otherwise, b2[m,n]=0.

The second binary thresholding process does not accurately separate edge regions from regions of uniform fill, but it does produce transformed images with relatively sharp and precise edge detail. The second binary thresholding process thus detects pixels that are part of text within the input image.

A logical AND block 21 combines the output from binary threshold block 18 with binary threshold block 20 at every pixel to produce an output image that contains relatively sharp text and graphics edges because the text and graphic outlines are detected and separated from the background. The resulting "cartoon-like" representation substantially reduces the entropy of mixed content documents so that the G3/G4 compression algorithms can achieve improved compressibility. The result is a computationally efficient process that produces a reduced compressed file size.

Figure 4:
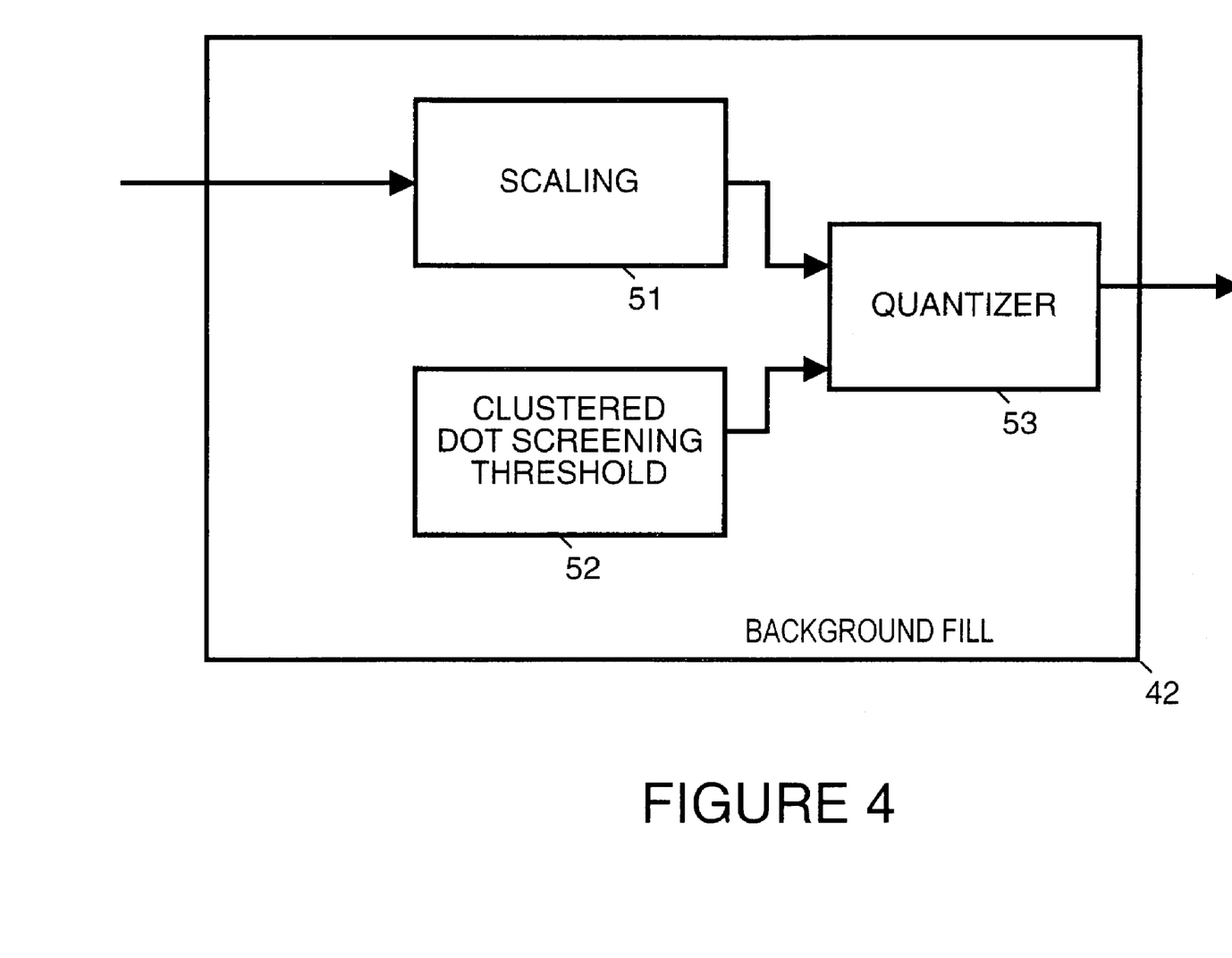
FIG. 4 is a block diagram of a background fill module within the transformation module shown in FIG. 2, in accordance with an embodiment of the present invention.

FIG. 4 is a block diagram of a background fill module 42. Background fill module includes a scaling module 51. For example, scaling module 51 scales input image 11 to make it lighter. This helps to prevent text and edges from being obscured when a combined with background fill. For example, input image 11 is a grayscale image with gray levels from 0 (white) to 255 (black). Using multiplication and rounding, scaling module 51 proportionally scales input image 11 to have gray levels 0 to 100. That means all the pixels within input image are proportionally lighted. Thus, a pixel that had a gray level of 255 in input image, after scaling, has a gray level of 100. This is a significantly lighter value for the pixel. The scaling is done in preparation for clustered dot screening.

A clustered dot screening threshold module 52 generates thresholds for each pixel based on a clustered dot screening threshold pattern. For each pixel of input image 11, quantizer 53 compares the filtered value from scaling module 51 with a corresponding threshold from clustered dot screening threshold module 52 to generate a pixel of output. For example, a 16×16 matrix of thresholds for 257 gray levels is used. For each 16×16 matrix, consecutive thresholds are located in spatial proximity (clustered). Thus in the center of the matrix, thresholds are very low. In the corners of the matrix, thresholds are very high. While quantizer 53 is shown generating a single pixel of output for a binary process, in alternative embodiments, quantizer 53 can also generate multiple bits for multilevel halftoning.

Figure 5:
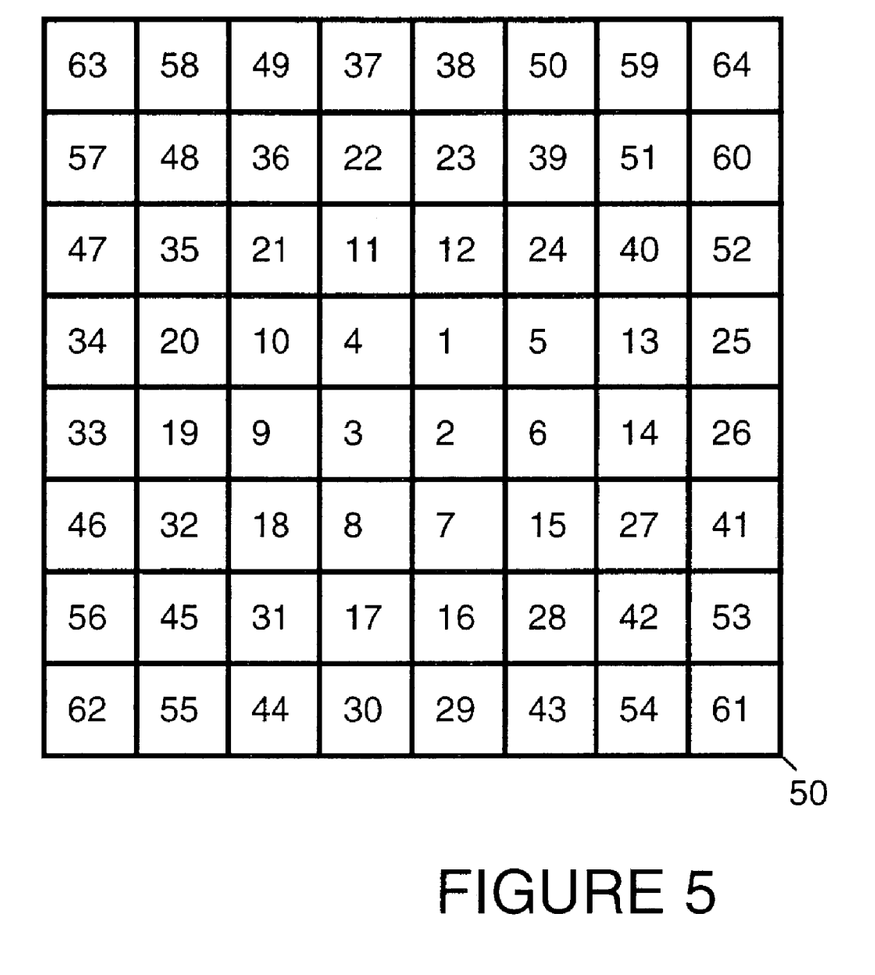
FIG. 5 illustrates clustered dot screening threshold generation.

Thresholds for clustered dot screening are illustrated in FIG. 5. FIG. 5 shows an example of threshold outputs from clustered dot screening threshold module 52 when there are 65 gray levels that are arranged in 8×8 matrices. For each 8×8 matrix, consecutive thresholds are located in spatial proximity (clustered). Thus in the center of matrix 50 shown in FIG. 5, thresholds are very low (e.g., with values of 1, 2, 3 and 4). In the corners of matrix 50 shown in FIG. 5, thresholds are very high (e.g., with values of 61, 62, 63 and 64). While FIG. 5 shows an 8×8 matrix of thresholds for 65 gray levels, other size matrixes with different gray levels may be used. For example, a 16×16 matrix of thresholds for 257 gray levels may be used, or a 4×4 matrix of thresholds for 9 gray levels may be used, and so on.

When clustered dot screening threshold module 52 forwards to quantizer a low threshold towards the center of the 8×8 matrix, it is very likely that the threshold will be less than the pixel value for the corresponding pixel received from scaling module 51. For example, if quantizer 53 is a binary quantizer, a low threshold increases the likelihood that quantizer will output a "1" or "black" for the pixel.

When clustered dot screening threshold module 52 forwards to quantizer a high threshold towards the outside of the 8×8 matrix, it is very likely that the threshold will be more than the pixel value for the corresponding pixel received from scaling module 51. For example, if quantizer 53 is a binary quantizer, a high threshold increases the likelihood that quantizer will output a "0" or "white" for the pixel.

Quantizer 53 is, for example, a binary quantizer used for halftoning. Alternatively, quantizer 53 is multilevel quantizer used to generate multilevel output. Alternatively, quantizer 53 is a vector quantizer used to generate vector output for color reproduction.

The preferred embodiment of the present invention provides a flexible and efficient solution for mixed halftone and non-halftone TIFF documents that are compressed using the Fax (CCITT G3/G4) compression standard. The preferred embodiment of the present invention also provides a representation of binary mixed document content with improved compressibility using CCITT G3/G4 compression. This is a significant improvement over performing binary thresholding of an input document using a constant threshold for the entire image and CCITT G3/G4 compression. This is also a significant improvement over halftoning an input document using error diffusion such as Floyd Steinberg, with CCITT G3/G4 compression.

Figure 6:
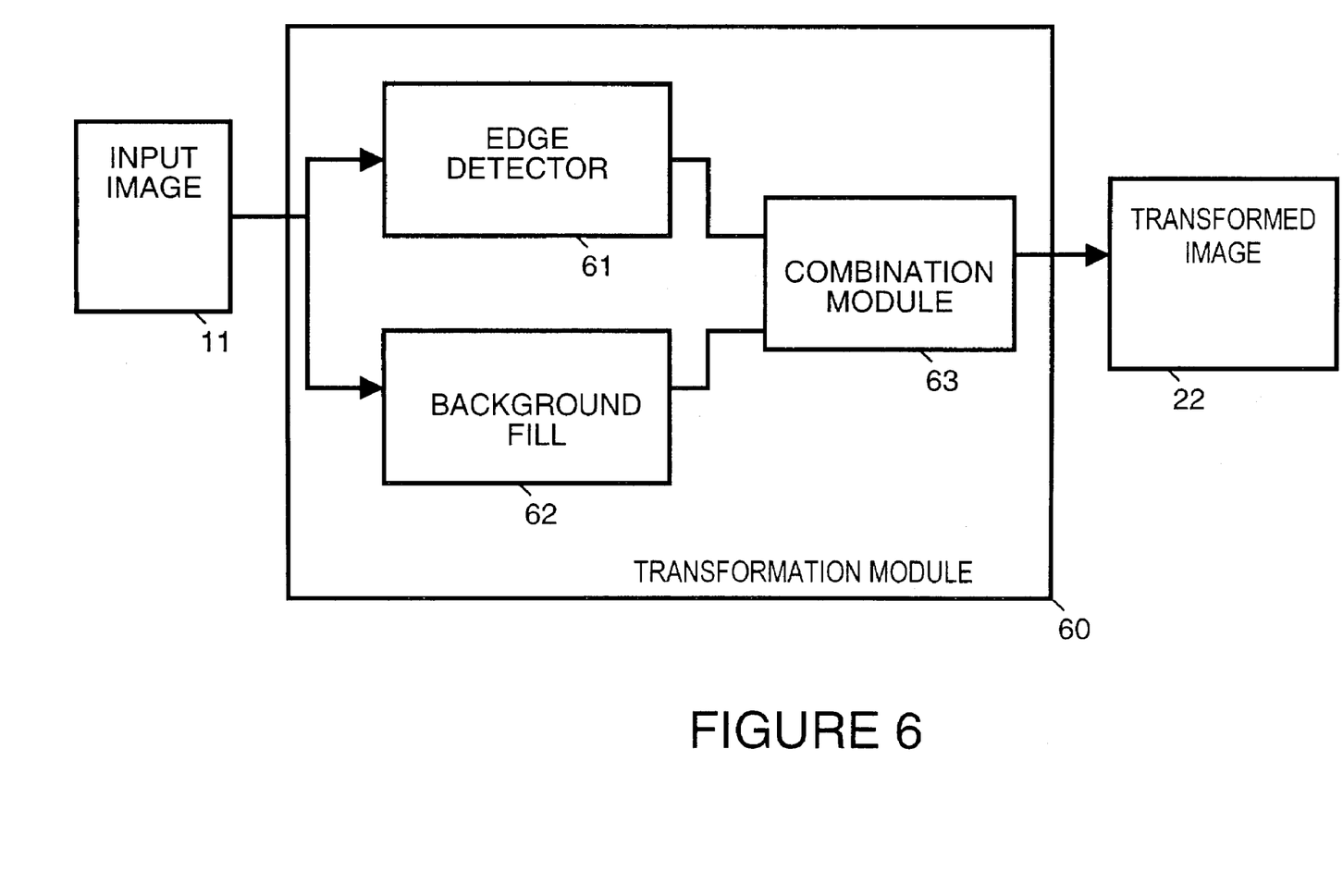
FIG. 6 is a block diagram of a transformation module of the digital sender shown in FIG. 1, in accordance with an alternative embodiment of the present invention.

FIG. 6 shows an alternate embodiment where a transformation module 60 performs just edge detection and background fill. Particularly, in this embodiment, transformation module 60 includes an edge detector 61 that detects edges within graphic regions within input image 11. The resulting image produced by edge detector 61 has improved compressibility and substantially preserves edges within and around graphics. For example, edge detection is performed using a local activity measure.

Transformation module 60 also includes a background fill module 62. Background fill module 62 represents the textures within input image 11, yet does so in a form that has improved compressibility. This is done, for example using a clustered dot scheme for halftoning input image 11.

A combination module 63 combines the output of edge detector 61 with the output of background fill module 62. The result is an image 22 having improved compressibility that substantially preserves graphics edges and texture from input image 11. For example, combination module 63 may perform a logical OR function on each pixel of the output of edge detector 61 and background fill module 62.

Figure 7:
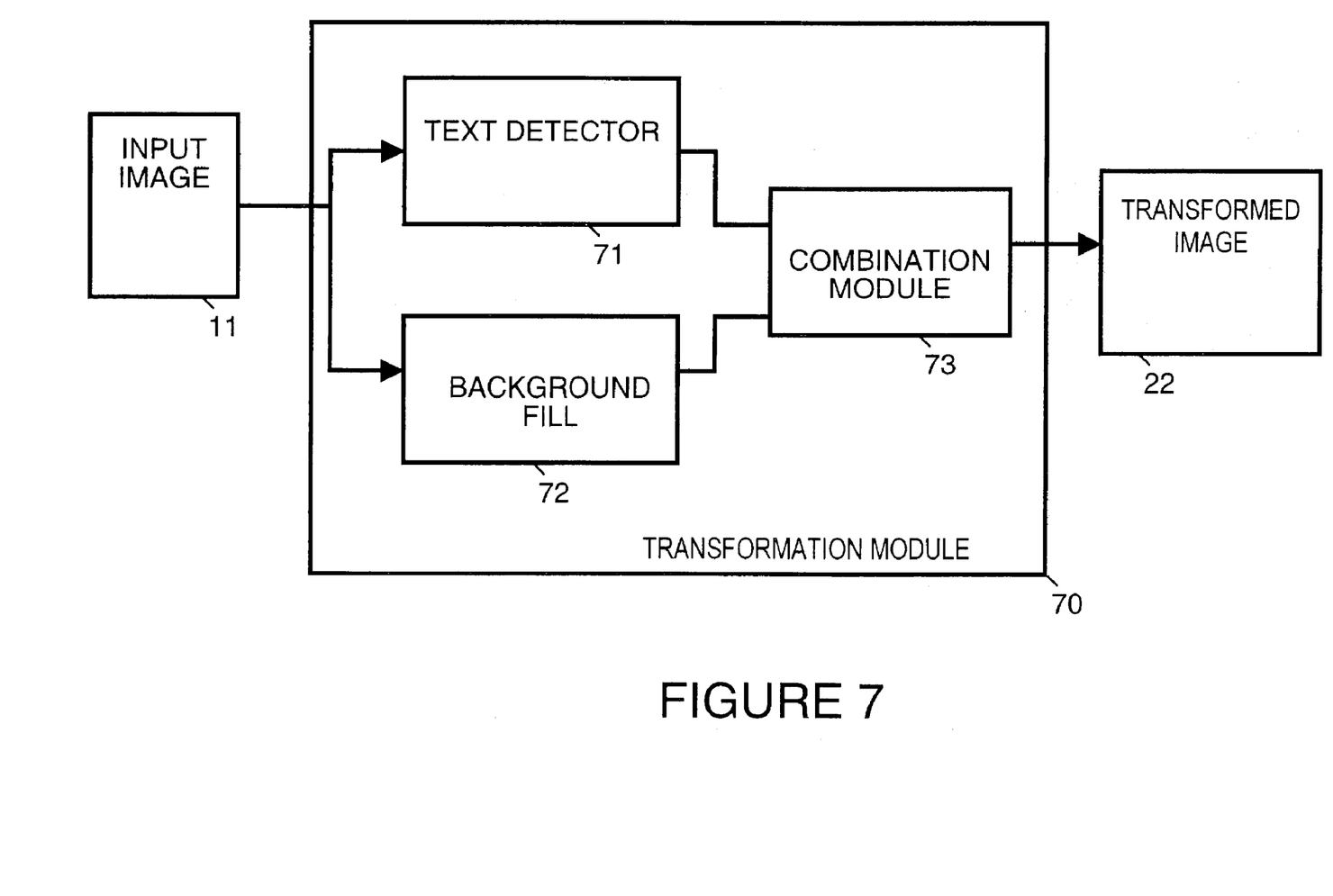
FIG. 7 is a block diagram of a transformation module of the device shown in FIG. 1, in accordance with another alternative embodiment of the present invention.

FIG. 7 shows an alternate embodiment where a transformation module 70 performs text detector and background fill. Particularly, in this embodiment, transformation module 70 includes a text detector 71 that detects texts within graphic regions within input image 11. The resulting image produced by text detector 71 is an image having improved compressibility that shows texts in relation to background fill. For example, text detection is performed using an 8×8 blockwise local mean value calculation.

Transformation module 70 also includes a background fill module 72. Background fill module 72 represents the textures within input image 11, yet does so in a form that has improved compressibility. This is done, for example using a clustered dot scheme for halftoning input image 11.

A combination module 73 combines the output of text detector 71 with the output of background fill module 72. The result is a transformed image 22 that has improved compressibility and substantially preserves texts and texture from input image 11. For example, combination module 73 may perform a logical OR function on each pixel of the output of text detector 71 and background fill module 72.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure is intended to be illustrative, but not limiting, of the scope of the invention, which is set forth in the following claims.

We claim:

1. A method for transforming an input image to produce an output image, the method comprising:
 (a) detecting pixels occurring at edges that represent detail within the input image to produce an intermediate image, the intermediate image not including any textures, from the input image, that are located between the edges;
 (b) generating background fill representing textures of the input image; and,
 (c) combining the background fill and the intermediate image to produce the output image.

2. A method as in claim 1 wherein step (a) includes performing a binary threshold process in which a local activity measure is calculated for each pixel of the input image.

3. A method as in claim 1 wherein step (b) includes the following substeps:
 scaling the input image to produce a scaled image that is lighter than the input image; and,
 performing clustered clot screening on the scaled image.

4. A method for transforming an input image to produce an output image, the method comprising:
 (a) detecting pixels that are part of text within the input image and are part of edges of graphic regions within the input image to produce an intermediate image that includes text and includes edges of graphic regions within the input image but does not include other textures within the input image;
 (b) generating background fill representing textures of the input image that are not included in the intermediate image; and,
 (c) combining the background fill and the intermediate image to produce the output image.

5. A method as in claim 4 wherein step (a) includes performing a binary threshold process in which for each pixel of the input image a local mean value for a block of pixels that contain the pixel is used as a threshold.

6. A method for transforming an input image to produce an output image, the method comprising:
 (a) detecting pixels that are part of text within the input image to produce an intermediate image;
 (b) generating background fill representing textures of the input image, including the following:
  scaling the input image to produce a scaled image that is lighter than the input image, and,
  performing clustered dot screening on the scaled image; and,
 (c) combining the background fill and the intermediate image to produce the output image.

7. A system comprising:
 an edge detector to detect pixels occurring at edges within the input image to produce an intermediate image, the intermediate image not including any textures, from the input image, that are located between the edges;
 a background fill module to generate background fill representing textures of the input image; and,
 a combining module to combine the background fill and the intermediate image to produce an output image.

8. A system as in claim 7 wherein the edge detector includes a configuration to detect the pixels by performing a binary threshold process in which a local activity measure is calculated for each pixel of the input image.

9. A system as in claim 7 wherein the background fill module includes:
 a scaling module that scales the input image to produce a scaled image; and,
 a clustered dot screening module that performs clustered dot screening on the scaled image.

10. A system comprising:
 an edge detector that detects pixels that are edge of text and graphics within the input image to produce an intermediate image, the intermediate image including edges of text and graphics but not including other textures within the input image;
 a background fill module that generates background fill representing textures of the input image that are not included within the intermediate image; and,
 a combining module that combines the background fill and the intermediate image to produce an output image.

11. A system as in claim 10 wherein the edge detector detects the pixels that are part of the text by performing a binary threshold process in which for each pixel of the input image a local mean value for a block of pixels that contain the pixel is used as a threshold.

12. A system comprising:
 a text detector that detects pixels that are part of text within the input image to produce an intermediate image;
 a background fill module that generates background fill representing textures of the input image, the background fill module including:
  a scaling module that scales the input image to produce a scaled image; and
  a clustered dot screening module that performs clustered dot screening on the scaled image; and,
 a combining module that combines the background fill and the intermediate image to produce an output image.

13. A method for transforming an input image to produce an output image, the method comprising:
 (a) detecting first pixels occurring at edges that represent detail within the input image;
 b) detecting second pixels that are part of text within the input image;
 (c) combining the first pixels and the second pixels to produce an intermediate image;
 (d) generating background fill representing textures of the input image; and,
 (e) combining the background fill and the intermediate image to produce the output image.

14. A method as in claim 13 wherein step (a) includes performing a binary threshold process in which a local activity measure is calculated for each pixel of the input image.

15. A method as in claim 13 wherein step (b) includes performing a binary threshold process in which for each pixel of the input image a local mean value for a block of pixels that contain the pixel is used as a threshold.

16. A method as in claim 13 wherein step (d) includes the following substeps:
 scaling the input image to produce a scaled image that is lighter than the input image; and,
 performing clustered dot screening on the scaled image.

17. A method as in claim 13 wherein the method additionally comprises the following step performed before step (a) and step (b):
 filtering portions of the input image detected as halftone image to remove undesired halftone textures.

18. A method as in claim 13 wherein step (a) includes the following substep:
 obtaining, for each pixel of the input image, a local difference between a shading value for the pixel and output from a lowpass filter that filters a matrix of pixels that includes the pixel, the local difference being the local activity measure for the pixel.

19. A method as in claim 13 wherein step (a) includes the following substeps performed for each pixel of the input image:
obtaining, for the pixel, a local difference between a shading value for the pixel and output from a lowpass filter that filters a matrix of pixels that includes the pixel, the local difference being the local activity measure for the pixel; and,
comparing the local activity measure for pixel with a preselected threshold to obtain a binary value for the pixel.

20. A method as in claim 13 wherein step (b) includes the following substep:
obtaining, for each block of pixels, a blockwise local mean shading value; and,
for every pixel within each block of pixels, using the blockwise local mean shading value as a threshold when obtaining a binary value for the pixel.

21. A method as in claim 13 additionally comprising the following step:
compressing the intermediate image.

22. A computer readable medium that stores instructions for performance of a method for transforming an input image to produce an intermediate image, the method comprising:
(a) detecting first pixels occurring at edges within the input image;
(b) detecting second pixels that are part of text within the input image;
(c) combining the first pixels and the second pixels to produce an intermediate image;
(d) generating background fill representing textures of the input image; and,
(e) combining the background fill and the intermediate image to produce the output image.

23. A computer readable medium as in claim 22 wherein the method additionally comprises the following step performed before step (a) and step (b):
filtering portions of the input image detected as halftone image to remove undesired halftone textures.

24. A computer readable medium as in claim 22 wherein step
(a) includes the following substeps performed for each pixel of the input image: obtaining, for the pixel, a local difference between a shading value for the pixel and output from a lowpass filter that filters a matrix of pixels that includes the pixel, the local difference being the local activity measure for the pixel; and, comparing the local activity measure for the pixel with a threshold value to obtain a binary value for the pixel.

25. A computer readable medium as in claim 22 wherein step (b) includes the following substep:
obtaining, for each block of pixels, a blockwise local mean shading value; and,
for every pixel within each block of pixels, using the blockwise local mean shading value as a threshold when obtaining a binary value for the pixel.

26. A computer readable medium as in claim 22 wherein step (d) includes the following substeps:
scaling the input image to produce a scaled image; and, performing clustered dot screening on the scaled image.

27. A system comprising:
an edge and text detector that detects first pixels occurring at edges that represent detail within the input image and that detects second pixels that are part of text within the input image and combines the first pixels and the second pixels to produce an intermediate image;
a background fill module that generates background fill representing textures of the input image; and,
a combining module that combines the background fill and the intermediate image to produce an output image.

28. A system as in claim 27 wherein the edge and text detector detects the first pixels by performing a binary threshold process in which a local activity measure is calculated for each pixel of the input image.

29. A system as in claim 27 wherein the edge and text detector detects the second pixels by performing a binary threshold process in which for each pixel of the input image a local mean value for a block of pixels that contain the pixel is used as a threshold.

30. A system as in claim 27 wherein the background fill module includes:
a scaling module that scales the input image to produce a scaled image; and,
a clustered dot screening module that performs clustered dot screening on the scaled image.

31. A system as in claim 27 wherein the system is a digital sender.

32. A system as in claim 27 wherein the system is a fax machine.

33. A system as in claim 27 wherein the intermediate image is a binary image.

34. A system comprising:
edge and text detector means for detecting detects first pixels occurring at edges that represent detail within the input image, for detecting second pixels that are part of text within the input image, and for combining the first pixels and the second pixels to produce an intermediate image;
background fill means for generating background fill representing textures of the input image; and,
combining module for combining the background fill and the intermediate image to produce an output image.

35. A system as in claim 34 wherein the edge and text detector means detects the first pixels by performing a binary threshold process in which a local activity measure is calculated for each pixel of the input image.

36. A system as in claim 34 wherein the edge and text detector means detects the second pixels by performing a binary threshold process in which for each pixel of the input image a local mean value for a block of pixels that contain the pixel is used as a threshold.

37. A system as in claim 34 wherein the background fill means includes:
scaling means for scaling the input image to produce a scaled image; and,
clustered dot screening means for performing clustered dot screening on the scaled image.

38. A system as in claim 34 wherein the system is a digital sender.

39. A system as in claim 34 wherein the system is a fax machine.

40. A system as in claim 34 wherein the system includes a scanner.

41. A system as in claim 34 wherein the intermediate image is a binary image.

* * * * *

UNITED STATES PATENT AND TRADEMARK OFFICE
CERTIFICATE OF CORRECTION

PATENT NO. : 7,336,400 B2
APPLICATION NO. : 10/284803
DATED : February 26, 2008
INVENTOR(S) : Guotong Feng et al.

It is certified that error appears in the above-identified patent and that said Letters Patent is hereby corrected as shown below:

In column 7, line 21, in Claim 3, delete "clot" and insert -- dot --, therefor.

In column 7, line 28, in Claim 4, after "image" insert -- , --.

In column 7, line 46, in Claim 6, after "and" delete ",".

In column 8, line 4, in Claim 10, after "are" delete "edge" and insert -- edges --, therefor.

In column 8, line 27, in Claim 12, after "image" delete ";" and insert -- , --, therefor.

Signed and Sealed this

Fifth Day of August, 2008

JON W. DUDAS
*Director of the United States Patent and Trademark Office*